Feb. 21, 1939.    C. D. GALLOWAY    2,148,371
RACK FOR STORAGE BATTERY PLATES AND OTHER OBJECTS
Filed Dec. 30, 1937

WITNESS:
Rob R Mitchel

INVENTOR
Charles D. Galloway
BY
Augustus B. Stoughton
ATTORNEY

Patented Feb. 21, 1939

2,148,371

UNITED STATES PATENT OFFICE

2,148,371

RACK FOR STORAGE BATTERY PLATES AND OTHER OBJECTS

Charles D. Galloway, Philadelphia, Pa., assignor to The Electric Storage Battery Company, Philadelphia, Pa., a corporation of New Jersey Application December 30, 1937, Serial No. 182,425

3 Claims. (Cl. 211—41)

The principal object of the present invention is to provide a comparatively simple rack for supporting unstable objects such as storage battery plates, grids, cards, sheets of metal and the like, in substantially vertical position in such a way as to allow removal or addition of one or more of the articles between those in the rack without having the remaining objects fall over or out of position.

Other objects of the invention will appear from the following description at the end of which the invention will be claimed.

Generally stated, the invention comprises a base or support, guide rails arranged above the base and in parallel relation and provided with confronting undercut grooves having overhanging edges, round nosed plungers arranged in contact with each other and mounted in the grooves for projection and retraction in respect to the overhanging edges, and a springy backing for the plungers which causes their noses to project beyond the overhanging edges into the path or against the vertical edges of the objects to be held in upright position.

The invention also comprises the improvements to be presently described and finally claimed.

In the following description reference will be made to the accompanying drawing forming part hereof and in which, Figure 1 is a transverse sectional view of a rack embodying features of the invention and showing a storage battery plate in application thereto.

Figure 4:
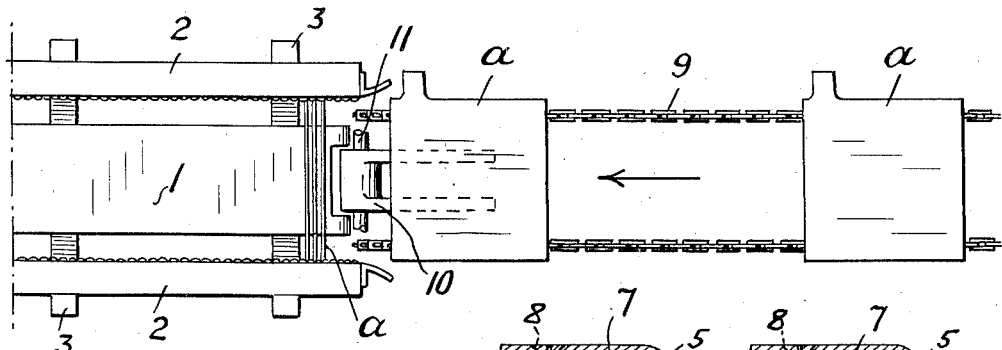
Figures 4 and 5 are respectively a top or plan view with parts omitted for the sake of clearness and a side view of a rack embodying features of the invention in association with loading mechanism therefor.

Referring to the drawing, 1 indicates a base or support and 2 generally indicates guide rails arranged above the base and in spaced parallel relation. The rails 2 are shown as supported by supports 3 rising from the base because that is a convenient method of support in the use of the rack as shown in the drawing, but the supporting means obviously need not be of the exact form shown. Each guide rail 2 is provided with an undercut groove 4 having overhanging edges 5, and the grooves of the rails are arranged in confronting relation. 6 are plungers shown in Fig. 2 in the form of balls and they are arranged in contact with each other and mounted in the grooves.

The noses of the plungers are round or spherical and they may project beyond the overhanging edges 5 and be retracted into the groove; however, the plungers may not escape from the grooves because they are confined therein by the overhanging edges 5. 7 indicates a springy back or cushion as of rubber and it is arranged in the grooves and is operative on the plungers to cause their round noses to yieldingly project beyond the edges of the grooves.

The mode of operation may be described as follows:

The round noses of the plungers are forced to protrude by the springy backing to the desired extent into the path or against the edges of the objects to be held in an upright position on one of their edges. The described arrangement of plungers will allow either the removal or addition of one or more articles from between the guide rails without the remaining objects falling over or out of position, and additional objects may be introduced from one end of the rack and similarly they may be withdrawn from the rack at one of its ends.

Figures 2, 3:
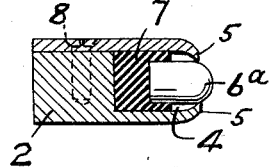
Fig. 2 is an enlarged transverse view of one of the guide rails.
Fig. 3 is a sectional view illustrating a modification.

The construction and mode of operation of the modification shown in Fig. 3 is as above described except that the round nosed plunger 6ª is cylindrical rather than spherical in form.

In both Figs. 2 and 3, the rail is shown as made in two parts, each provided with one of the overhanging edges or lips 5, and one of these parts may provide the major portion of the groove. The two parts are shown as detachably connected by means of screws 8. This construction provides for the convenient construction and assembly of the parts.

Figure 5:
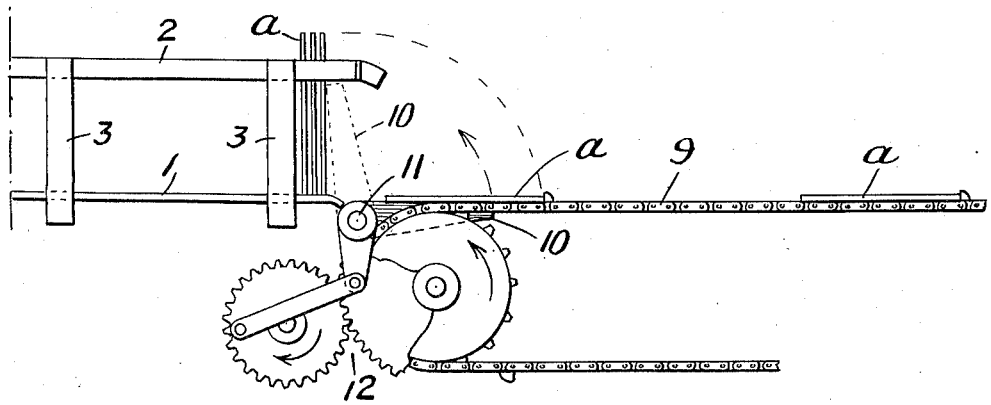
Figure 1:
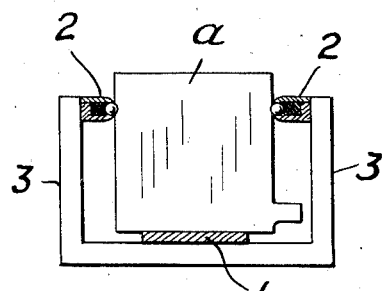

Referring to Figs. 4 and 5, the described rack is shown in association with means for loading it with storage battery plates or grids and the rack is particularly useful in that connection.

Referring to Figs. 4 and 5, storage battery plates or grids *a* are fed by the conveyor 9 to a position above the lifter 10 turnably mounted at one end 11, so as to lift a plate *a* from the conveyor and carry it into the rack at one end thereof. By a repetition of this operation the rack is filled with plates or grids of which each oncoming one pushes the other along the rack between the plungers 6 or 6ª which operate, as described, to keep the plates or grids in generally vertical position, and further to permit of the removal of an intermediate plate or grid whilst the others are held in vertical position, and further to permit of the insertion of a plate or grid at any intermediate portion of the rack. 12 indicates gearing and linkage by means of which the conveyor 9 and the lifter 10 are operated in properly timed relation.

It will be obvious to those skilled in the art to which the invention relates that modifications may be made in details of construction and arrangement without departing from the spirit of the invention which is not limited in respect to such matters or otherwise than as the prior art and the appended claims may require.

I claim:

1. A rack for storage battery plates and other objects comprising, a flat base or support adapted to contact with and uphold one edge of the storage battery plates, guide rails arranged above the base in spaced parallel relation and respectively provided with under cut grooves having overhanging portions, said grooves being arranged in confronting relation, plungers arranged in contact with each other and mounted in the grooves and having rounded noses, and a backing of resilient material arranged in each of said grooves and operating on said plungers to cause a portion of their rounded noses to yieldingly project beyond the edges of the grooves.

2. The combination substantially as described in claim 1 in which the round nosed plungers are of spherical form.

3. The combination substantially as described in claim 1 in which the plungers are of generally cylindrical form and are provided with round noses.

CHARLES D. GALLOWAY.